(12) United States Patent
Valembois

(10) Patent No.: US 11,976,680 B2
(45) Date of Patent: May 7, 2024

(54) FASTENING DEVICE FOR ASSEMBLY AND QUICK RELEASE BETWEEN OBJECTS

(71) Applicant: SOTEREM, Castanet-Tolosan (FR)

(72) Inventor: Guy Valembois, Lauzerville (FR)

(73) Assignee: SOTEREM, Castanet-Tolosan (FR)

( * ) Notice: Subject to any disclaimer, the term of this patent is extended or adjusted under 35 U.S.C. 154(b) by 553 days.

(21) Appl. No.: 17/280,362

(22) PCT Filed: Sep. 26, 2019

(86) PCT No.: PCT/IB2019/058177
§ 371 (c)(1),
(2) Date: Mar. 26, 2021

(87) PCT Pub. No.: WO2020/065575
PCT Pub. Date: Apr. 2, 2020

(65) Prior Publication Data
US 2022/0034341 A1    Feb. 3, 2022

(30) Foreign Application Priority Data
Sep. 26, 2018   (FR) .................................... 18 58811

(51) Int. Cl.
*F16B 2/06* (2006.01)
*F16F 1/10* (2006.01)
*F16F 1/12* (2006.01)

(52) U.S. Cl.
CPC .................. *F16B 2/06* (2013.01); *F16F 1/10* (2013.01); *F16F 1/122* (2013.01)

(58) Field of Classification Search
CPC .. F16B 2/06; F16B 21/09; F16B 21/10; F16F 1/10; F16F 1/122; H01H 85/00;
(Continued)

(56) References Cited

U.S. PATENT DOCUMENTS 290,351 A * 12/1883 Parry ................... B65D 45/345
                                                                  24/30.5 R
5,282,709 A *  2/1994 Chaput ................... F16B 31/00
                                                                  411/270
(Continued)

FOREIGN PATENT DOCUMENTS

AT           510027 A4    1/2012
DE     102014000288 A1    7/2015
(Continued)

OTHER PUBLICATIONS

Machine Translation, via espacenet, of WO2009138625A2, generated Oct. 12, 2023 (Year: 2009).*

*Primary Examiner* — Daniel J Wiley
(74) *Attorney, Agent, or Firm* — Craft Chu PLLC; Andrew W. Chu

(57) ABSTRACT

A fastening device for assembly and quick release between objects includes a retaining device for an attachment element with a dockable portion. There is a plurality of separable parts held close together around the attachment element by at least one disengageable preloading mechanism. The preloading mechanism includes a link wound around the separable parts in order to hold them closed on the attachment element, which has the appearance of a ribbon wound in a spiral and has spring properties. The ribbon has a non-constant thickness, i.e. the thickness decreases from the inside towards the outside of the spiral. The thickness decreases with the angle of the spiral. It is manufactured as such, in its final form, by a manufacturing process employing either the removal of material by machining, or by aggregation of material.

10 Claims, 1 Drawing Sheet

(58) Field of Classification Search
CPC ........ H01H 85/06; H01H 85/08; B64G 1/222; B64G 1/44; B64G 1/645
See application file for complete search history.

(56) References Cited

U.S. PATENT DOCUMENTS

| | | | | |
|---|---|---|---|---|
| 6,073,914 | A * | 6/2000 | Roth | B64G 1/222 29/452 |
| 6,433,990 | B1 * | 8/2002 | Rudoy | B64G 1/645 361/160 |
| 8,021,069 | B2 * | 9/2011 | Baghdasarian | B64G 1/645 337/401 |
| 8,327,511 | B2 * | 12/2012 | Valembois | B64G 1/222 24/603 |
| 8,904,889 | B2 * | 12/2014 | Rudoy | G05G 17/00 74/2 |
| 9,657,863 | B2 * | 5/2017 | Brennan, III | F16K 11/0704 |
| 10,029,809 | B1 * | 7/2018 | Vega | H01H 85/041 |
| 10,062,537 | B1 * | 8/2018 | Vega | H01H 85/06 |
| 2011/0030178 | A1 * | 2/2011 | Valembois | B64G 1/222 24/458 |
| 2015/0233293 | A1 | 8/2015 | Grogg | |

FOREIGN PATENT DOCUMENTS

| | | |
|---|---|---|
| EP | 0684216 A1 | 11/1995 |
| EP | 3354578 A1 | 8/2018 |
| FR | 2930305 A1 | 10/2009 |
| WO | 2007050561 A1 | 5/2007 |
| WO | 2009138625 A2 | 11/2009 |

\* cited by examiner

FASTENING DEVICE FOR ASSEMBLY AND QUICK RELEASE BETWEEN OBJECTS

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to a fastening device used to assemble objects together, then to release them quickly, formed of a retaining means configured to retain, before releasing, a hooking element, said retaining means consisting of the approximation, about a securing portion of said hooking element, of several separable parts kept close together through releasable pre-stressing means. It relates more particularly to said releasable pre-stressing means.

Such a fastening device is used, non-restrictively, in the field of useful separation mechanisms when releasing a load on an airplane, opening solar generators on a satellite, releasing any safety mechanism, etc.

2. Description of Related Art Including Information Disclosed Under 37 CFR 1.97 and 37 CFR 1.98

Such a fastening device is described in document WO 2009/138625 in the name of the present Applicant, and shown in FIG. 1 (PRIOR ART).

According to this document, the retaining means is in the form of a clamp P, where the separable parts E are connected to each other through elastically deformable means, which tend to restore the distance separating them from each other; while said pre-stressing means consist of an element forming a link L, wound about said separable parts E so as to keep them closed on a fastening element R provided with a securing end, not visible in the figure, and at least one end of which is fastened to a mechanism T for maintaining the tension exerted onto this link, which comprises means permitting to release this tension on request.

Preferably, the link is in the form of a ribbon made of metal or of a composite or synthetic material, wound onto itself in order to be shaped in a form of a spiral spring, which has the features of a spring, one end of which, on the side of the inner winding, is made integral with one of the separable portions of the retaining means, while the other end, on the side of the outer winding, is, after winding said ribbon on said retaining means about said separable portions, made integral with a retaining mechanism permitting the expansion of said ribbon on release.

It has however been found that this embodiment has drawbacks.

The loading due to the stress of the clamp under load is mainly supported by the inner windings of the spiral spring, which therefore induces an over-stress on these inner windings, while the outer windings are under-stressed.

When using multiple release mechanisms simultaneously, the timing of the releases directly depends on the controller, which must release the spiral ribbons at the same time, in association with the opening dynamics of those ribbons. This requires these ribbons to be strictly identical, which is extremely difficult to achieve by plastic deformation of the metal.

In practice, the hooking area of the inner end is obtained by folding the metal strip, even though this area is the most stressed one. As a result, this area combines the functional tensile stress due to the expansion under load with the unfolding stress of the metal ribbon. This phenomenon is particularly crucial because the metal bent at this spot is already weakened by its shaping. In brief, this hooking area is a very weak spot of the spiral spring.

The resistance to expansion of the spiral spring is achieved mainly by friction between the windings of the spring, which does not prevent any relative sliding between the windings, particularly observed during thermal cycles causing expansions suitable to promote this sliding. This phenomenon causes a reduction in loading of the elements to be released during thermal cycles.

BRIEF SUMMARY OF THE INVENTION

The aim of the present invention is to provide a fastening device, as defined above, the releasable pre-stressing means of which has features permitting to cope with the various aforementioned drawbacks.

According to the invention, the link has the appearance of a spirally wound ribbon and has the features of a spring, and this link is characterized in that it has a non-constant thickness, namely that this thickness is decreasing from the inside to the outside of the spiral, this thickness decreasing with the angle of the spiral.

The so obtained spring has a low inertia, in any case less high than if the thickness of the ribbon were constant as for a spiral spring of a conventional type. Since from this inertia results the speed of unwinding of the spring when it is released, the releasable pre-stressing means according to the invention permits a faster opening dynamic of the clamp.

According to an additional feature of the fastening device according to the invention, the ribbon is manufactured as it is, in its final shape, by a manufacturing process implementing either the removal of material by machining or the aggregation of material.

Such a spiral spring is not produced in the usual way by shaping under stress of a metal strip, hence it does not have its defects. Advantageously, so manufactured springs out of the same material all have the same features, so that they can be used for simultaneous releases.

According to a particular embodiment of the invention, the machining process is a wire spark erosion process.

According to a further particular embodiment of the invention, the manufacturing process by aggregation of material is a 3D metal printing process.

According to a further particular embodiment of the invention, the manufacturing process by aggregation of material is completed with an operation of molding, then solidification.

The method for manufacturing the spring according to the invention permits to provide particular shapes that cannot be obtained by the conventional method for shaping a ribbon. Thus and non-restrictively, each of the ends can have a functional shape.

According to an additional feature of the fastening device according to the invention, the inner end of the ribbon is made integral with one of the separable elements, to this end, said end includes a bulge inserted in a cavity provided for in said separable element, having a complementary and retentive shape.

According to a further additional feature of the fastening device according to the invention, the outer end of the ribbon is shaped as a hook permitting the fastening of a means capable of maintaining the tension.

According to a further additional feature of the device according to the invention, the outer end of the ribbon includes a means permitting to guarantee the locking of the closed position, which consists of an element radially protruding from said ribbon, associated with a hollow portion having a complementary shape capable of anchoring said element during the tensioning.

According to a further additional feature of the device according to the invention, the ribbon includes on a portion, capable of comprising several windings, a multiplicity of elements radially protruding from said ribbon, as well as a multiplicity of hollow portions having a complementary shape, the spacing pitches being chosen so that, in a stressed position of the clamp, each of said protruding elements is inserted in one of said hollow portions.

According to a further additional feature of the device according to the invention, the outer end of the ribbon includes a means permitting to guarantee the locking of the closed position, which consists of a rivet mounted at said outer end, and having a protuberance capable of cooperating with a hole drilled in the outer winding of said ribbon.

This embodiment of the releasable pre-stressing means according to the invention has further advantages.

In the closed position and during expansion stress, the tensile stress is almost uniform in the windings.

It is particularly resistant at the level of its inner end, which permits to make at same solid means for fastening to the clamp.

In the case of a manufacturing by wire spark erosion machining, this permits the use of pretreated materials, thus particularly resistant materials, such as TA6V in grade 5, Inconel, hard steel etc.

On the other hand, a manufacturing by wire spark erosion machining also permits to guarantee an accuracy suitable for permitting similar unwinding dynamics for a whole population of springs, which is particularly desirable for simultaneous and synchronous use.

The advantages and features of the fastening device according to the invention will become clear from the following description, which refers to the attached drawing, which represents several non-restrictive embodiments of same.

DETAILED DESCRIPTION OF THE INVENTION

Figure 2:
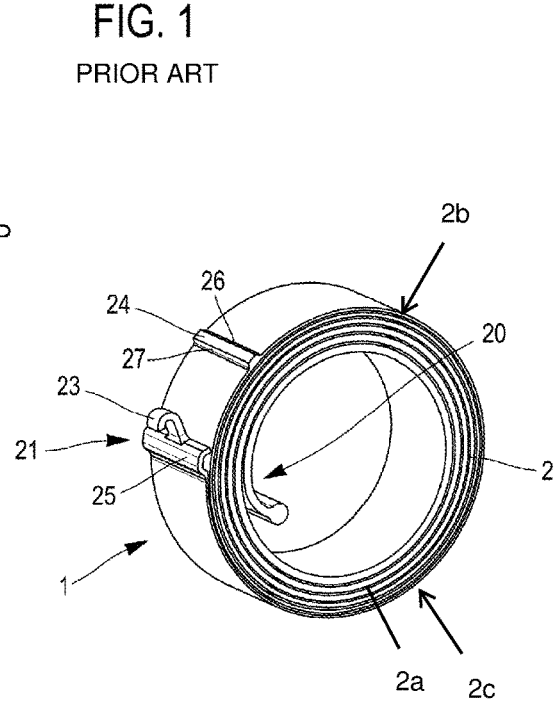
FIG. 2 shows a perspective view of a pre-stressing means of a fastening device according to the invention.

When referring to FIG. 2, there is a releasable pre-stressing means 1 according to the invention, which is in the form of a link 2a being comprised of a ribbon 2, being wound into a spiral 2b so as to form a spring 2c and having the peculiarity of having a non-constant thickness, i.e. [it] the ribbon 2 decreases from an inside portion of the ribbon at the inner end 20 to an outside portion of the ribbon at the outer end 21.

This feature is related to the method of manufacturing this ribbon, namely, according to the invention, by removal of material by machining, or by aggregation of material by 3D printing or molding.

Preferably, but non-restrictively, the decrease is constant.

Figure 1:
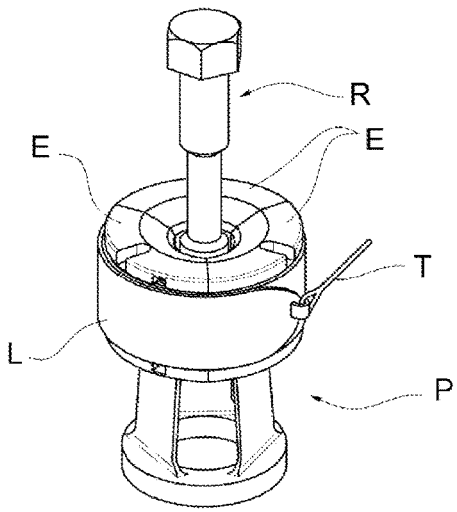
FIG. 1 shows a perspective view of a fastening device of the prior art and more specifically according to document WO 2009/138625.
Figure 3:
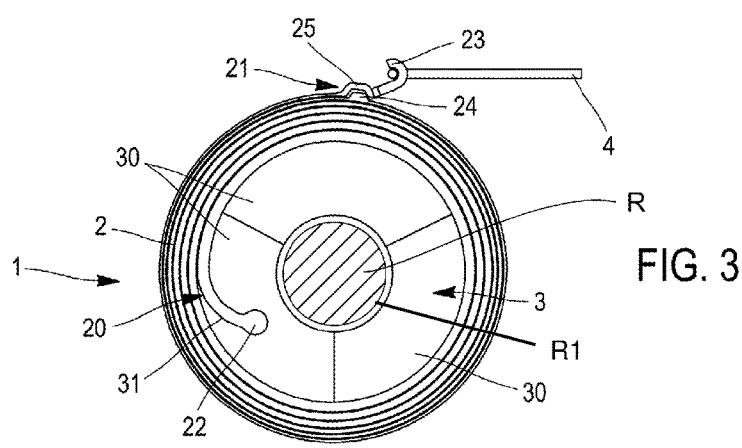
FIG. 3 shows a schematic view of the same fastening device, in use.

When referring now to FIG. 3, there is the releasable pre-stressing means 1 associated with a clamp or retaining means 3, of the type of the one P of FIG. 1 and described in document WO 2009/138625. Of this clamp or retaining means 3, only three separable elements 30 are visible, which are intended to surround and retain a schematically shown fastening or hooking element R having a securing portion R1 in order to form a fastening device.

These separable elements 30 are furthermore elastically restored into their distance from each other, the releasable pre-stressing means 1 being capable of forcing them to come closer to each other.

The inner end 20 and one of the separable elements 30 are shaped so as to be made integral with each other.

According to the embodiment being shown, the inner end 20 has a bulge 22, while the separable element 30 includes a cavity 31 having a complementary retentive shape, in which the bulge 22 is inserted and retained.

In this case, the bulge 22 has the form of a cylinder, with an axis parallel to that of the winding of the ribbon 2.

The outer end 21 is shaped as a hook 23, permitting the fastening of a means 4 for maintaining and releasing tension exerted on the link 2a.

Advantageously, the releasable pre-stressing means 1 according to the invention further includes a means 24, 25, 24a, 25b for locking a closed position of the ribbon 2. The means 24, 25, 24a, 25b is in the ortho-radial direction in order to also lock the opening of the clamp or retaining means 3 and also locks the ribbon in the axial direction permitting to control the closed position during shocks and vibrations, which can cause parasitic sliding of the windings with respect to each other in the axial direction. The locking then occurs by obstacle, which prevents any sliding, even during stresses due to thermal cycles.

This means for locking the closed position consists of two elements having complementary shapes, a first protruding element 24 protruding from the periphery of the ribbon 2, and a second element (hollow portion) 25, arranged at the base of the hook 23, forming a hollow indentation complementary to the shape of the first protruding element 24 and intended, after closing, to anchor onto the latter. The means for locking the closed position can alternatively consist of a rivet 24a being mounted at the outer end 21 and having a protuberance 25a capable of cooperating with a hole 25b drilled in the outer end 21 of the ribbon.

Advantageously and preferably, the protruding element 24 is in the form of a protruding bar arranged transversely on the ribbon 2, and the sides 26 and 27 of which are beveled, so as not to oppose the release and not to hinder the expansion when unlocking.

According to a variant, not shown, the ribbon 2 includes several protruding elements 24 arranged and spaced apart longitudinally, eventually over several windings, as well as several elements or hollow portions 25 each capable of cooperating with a respective protruding element 24, in a tightened position about the pumice or retaining means 3.

Figure 4:
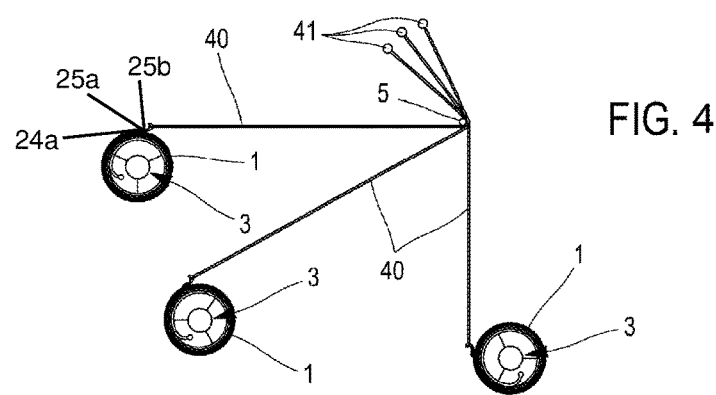
FIG. 4 shows a schematic view of several fastening devices according to the invention being implemented.

When referring to FIG. 4, we can see the use of three clamps or retaining means 3, each equipped with a releasable pre-stressing means 1 according to the invention.

The three clamps 3 are all in the closed position, the releasable pre-stressing means 1 being locked through links 40, which pass over a trigger pin 5, which angularly returns the links 40 to means 41 for fastening and maintaining the links in tension. 40.

It should be understood that the withdrawal of the trigger pin 5 causes the simultaneous release of the tension of all the links 40, and the expansion of the releasable pre-stressing means 1 and the opening of the clamps 3.

I claim:

1. A fastening device, comprising:
   a hooking element having a securing portion; and
   a retaining means being comprised of:
      a plurality of separable parts being retained around said securing portion; and
      a releasable pre-stressing means engaged with each separable part of said plurality of separable parts such that each separable part is elastically restored to a respective distance from each other and kept close together about said hooking element,
   wherein the releasable pre-stressing means is comprised of a link wound about said plurality of separable parts so as to keep each separable part of said plurality of separable parts closed on said hooking element,
   wherein said link has at least one end so as to be fastenable to a means for maintaining and releasing tension exerted on said link, and
   wherein said link is comprised of ribbon wound into a spiral so as to form a spring,
   wherein the ribbon has a non-constant thickness, and
   wherein said non-constant thickness decreases from an inside portion of said ribbon of said spiral to an outside portion of said ribbon of said spiral, said non-constant thickness decreasing at an angle.

2. The fastening device, according to claim 1, wherein said ribbon wound into said spiral is formed by a manufacturing process implementing either a machining process so as to remove material, or an aggregating process so as to add material.

3. The fastening device, according to claim 2, wherein the machining process is a wire spark erosion process.

4. The fastening device, according to claim 2, wherein the aggregating process is a three dimensional metal printing process.

5. The fastening device, according to claim 2, wherein the aggregating process further comprises a molding process and a solidification process.

6. The fastening device according to claim 1, wherein said ribbon has an inner end made integral with at least one separable element of said plurality of separate elements, said at least one separable element having a cavity, and
   wherein said inner end is comprised of a bulge being insertable into said cavity, said bulge and said cavity having complementary shapes so as to retain said bulge in said cavity.

7. The fastening device, according to claim 1, wherein said ribbon has an outer end shaped so as to form a fastening hook so as to be fastenable to the means for maintaining and releasing tension exerted on said link.

8. The fastening device, according to claim 1, wherein said ribbon has an outer end comprising a means for locking of a closed position of said ribbon, and
   wherein the means for locking is comprised of a protruding element radially protruding from said ribbon, and a hollow portion having a complementary shape to said protruding element so as to anchor said hollow portion to said protruding element.

9. The fastening device, according to claim 8, wherein the means for locking is further comprised of a plurality of protruding elements radially protruding from said ribbon, and a plurality of hollow portions, each hollow portion of said plurality of hollow portions having a complementary shape to a respective protruding element of said plurality of protruding elements so as to anchor each protruding element of said plurality protruding elements to a respective hollow portion of said plurality of hollow portions.

10. The fastening device, according to claim 1, wherein said ribbon has an outer end comprising a means for locking of a closed position of said ribbon,
    wherein the means for locking is comprised of a rivet being mounted at said outer end having a protuberance; and a hole being cooperative with said protuberance, said hole being drilled on said outer end of said ribbon.

* * * * *